United States Patent [19]
Sun

[11] Patent Number: 5,158,322
[45] Date of Patent: Oct. 27, 1992

[54] CLOSURE FOR VEHICLE TRIM

[75] Inventor: Xingyuan Sun, Sterling Heights, Mich.

[73] Assignee: Mayco Plastics, Inc., Sterling Heights, Mich.

[21] Appl. No.: 818,487

[22] Filed: Jan. 7, 1992

Related U.S. Application Data

[63] Continuation of Ser. No. 604,746, Oct. 26, 1990, abandoned.

[51] Int. Cl.⁵ .............................................. B60R 21/16
[52] U.S. Cl. .................................................. 280/732
[58] Field of Search ................ 280/728, 732, 743; 264/255, 275, 279.1; 180/90

[56] References Cited

U.S. PATENT DOCUMENTS

| | | | |
|---|---|---|---|
| 3,514,124 | 5/1970 | Richardson | 280/732 |
| 3,632,132 | 1/1972 | Richardson | 280/732 |
| 3,756,617 | 9/1973 | Brown | 280/732 |
| 3,767,229 | 10/1973 | Cain | 280/732 |
| 3,794,349 | 2/1974 | Fuller | 180/90 |
| 3,835,201 | 9/1974 | Fischer | 525/211 |
| 3,844,580 | 10/1974 | Scherenberg et al. | 280/728 |
| 3,853,334 | 12/1974 | Auman et al. | 280/728 |
| 3,887,214 | 6/1975 | Brawn | 280/730 |
| 3,900,210 | 8/1975 | Lohr et al. | 280/729 |
| 3,904,222 | 9/1975 | Bursott et al. | 280/732 |
| 3,922,429 | 11/1975 | Welch et al. | 180/90 |
| 3,937,258 | 2/1976 | Loomba | 141/67 |
| 3,966,227 | 6/1976 | Cameron | 180/90 |
| 4,120,516 | 10/1978 | Takamatsu et al. | 280/728 |
| 4,198,075 | 4/1980 | Kob et al. | 280/753 |
| 4,246,213 | 1/1981 | Takamatsu et al. | 264/46.7 |
| 4,565,535 | 1/1986 | Tassy | 441/118 |
| 4,663,210 | 5/1987 | Schreiber et al. | 180/90 |
| 4,672,091 | 6/1987 | Berta | 525/88 |
| 4,772,045 | 9/1988 | Kawaguchi et al. | 280/731 |
| 4,774,277 | 9/1988 | Janac et al. | 524/474 |
| 4,816,313 | 3/1989 | Hosakawa et al. | 428/90 |
| 4,834,420 | 5/1989 | Sankrithi et al. | 280/728 |
| 4,842,299 | 6/1989 | Okamura et al. | 280/732 |
| 4,846,362 | 7/1989 | Schloss | 215/349 |
| 4,852,907 | 8/1989 | Shiraki et al. | 280/731 |
| 4,871,805 | 10/1989 | Shimomura et al. | 525/98 |
| 4,881,754 | 11/1989 | Lutze et al. | 280/728 |
| 4,893,833 | 1/1990 | DiSalvo et al. | 280/732 |
| 4,915,411 | 4/1990 | Norton | 280/734 |
| 4,978,490 | 12/1990 | Jackson | 264/275 |
| 5,110,647 | 5/1992 | Sawada et al. | 428/43 |

FOREIGN PATENT DOCUMENTS

| | | | |
|---|---|---|---|
| 3116538 | 11/1982 | Fed. Rep. of Germany | 280/732 |
| 58-210950 | 12/1983 | Japan . | |
| 9014973 | 12/1990 | World Int. Prop. O. | 280/743 |

OTHER PUBLICATIONS

Applied Polymer Science, by J. Kenneth Craver and Roy W. Tess, published by the American Chemical Society, 1975, pp. 829-858.

Compounds Properties Guide (Shell Chemical Co.) (8 pages).

Primary Examiner—Charles A. Marmor
Assistant Examiner—Tamara L. Graysay
Attorney, Agent, or Firm—Brooks & Kushman

[57] ABSTRACT

Described is a closure capable of opening by expansion of an occupant restraint cushion in a recessed area of an interior vehicle trim comprising a first molded layer comprised of a mixture of a polypropylene composition and a thermoplastic elastomer composition; a second layer integrally molded with and on one side of the first layer covering the recess for the restraint cushion and comprised of a mixture of a polypropylene and a thermoplastic elastomer. The first layer has a frangible reduced thickness area on the opposite side of the second layer which area breaks upon exit of the restraint cushion within the closure. The second layer has a Shore A hardness and is softer than the first layer and is capable of bending upon exiting of the bag in a bending or compressing area near the frangible reduced thickness area of the first layer.

10 Claims, 1 Drawing Sheet

CLOSURE FOR VEHICLE TRIM

This is a continuation of U.S. Pat. No. 604,746 filed Oct. 26, 1990, now abandoned.

TECHNICAL FIELD

The present application is concerned with a closure for vehicle trim employing compositions of polypropylene type materials and thermoplastic elastomers.

BACKGROUND ART

The development of air bags for use in vehicle applications has been an important safety consideration. Occupant restraint systems have been disclosed in U.S. Pat. Nos. 3,904,222 and 3,887,214. These restraint systems are incorporated into the instrument panel structure. The air bag or inflatable occupant restraint cushion is generally retained in a recessed compartment in the instrument panel.

Closures for instrument panels are disclosed in U.S. Pat. Nos. 4,893,833 and 4,842,299. Each of these patents require many attachments to the instrument panel or have portions of the closure which may fly about the interior compartment of a vehicle during deployment. The use of an appropriately designed closure leads to a need for soft plastic materials that can be readily produced in high volume.

Thermoplastic elastomer blends containing ethylene-propylene thermoplastic block copolymer elastomers as is described in U.S. Pat. No. 4,672,091. Thermoplastic blends of copolymer rubber and polyolefin plastic are described in U.S. Pat. No. 3,835,201. of polyolefin plastics with elastomeric plasticizes are described in U.S. Pat. No. 4,774,277. Polypropylene compositions blended with styrene-ethyl-ene-butylene-styrene block copolymers are described in U.S. Pat. No. 4,871,805.

None of the prior art documents disclose a closure for an occupant restraint system that is comprised of a plurality of molded plastic layers comprised of a mixture of polypropylene and thermoplastic elastomers which layers are of differing Shore hardness and wherein one of the layers has a frangible breaking area which facilitates the opening of the closure by rapid expansion of the inflatable restraint cushion upon deployment.

SUMMARY OF THE INVENTION

Disclosed is a closure capable of opening by expansion of an occupant restraint cushion in a recessed area of an interior vehicle trim comprising:

a first molded layer comprised of a mixture of a polypropylene composition and a thermoplastic composition;

a second layer integrally molded with and on one side of the first layer covering the recess for the restraint cushion and comprised of a mixture of a polypropylene composition and a thermoplastic elastomer;

wherein the first layer has a frangible area on the opposite side of the second layer which area breaks upon exit of the restraint cushion within the closure; and wherein the second layer has a Shore A hardness and is softer than the first layer and is capable of breaking upon exiting of the restraint cushion in a breaking area near the frangible area of the first layer.

The invention is also concerned with the method of manufacturing the closure by integrally molding the plastic layers such as by an injection molding technique.

DESCRIPTION OF PREFERRED EMBODIMENTS

Figure 1:
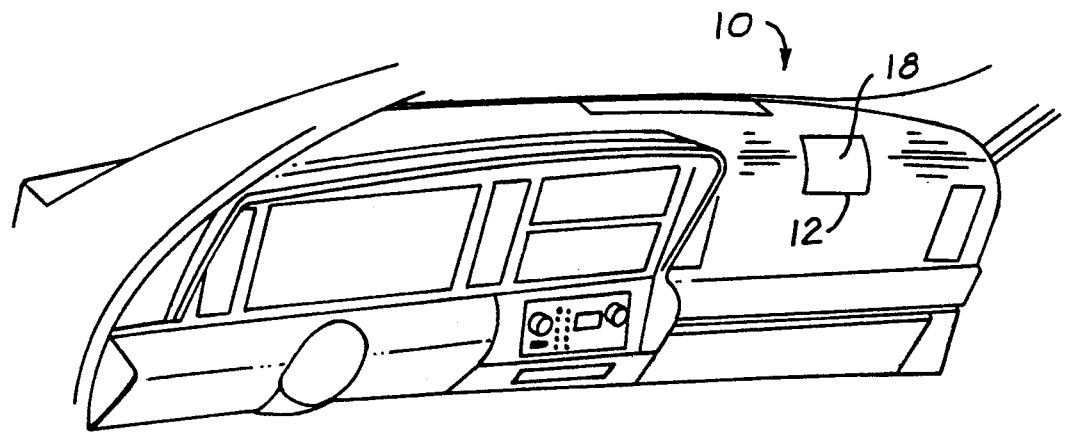
FIG. 1 is a view of an instrument panel with the closure of the present invention in a closed condition.
Figure 2:
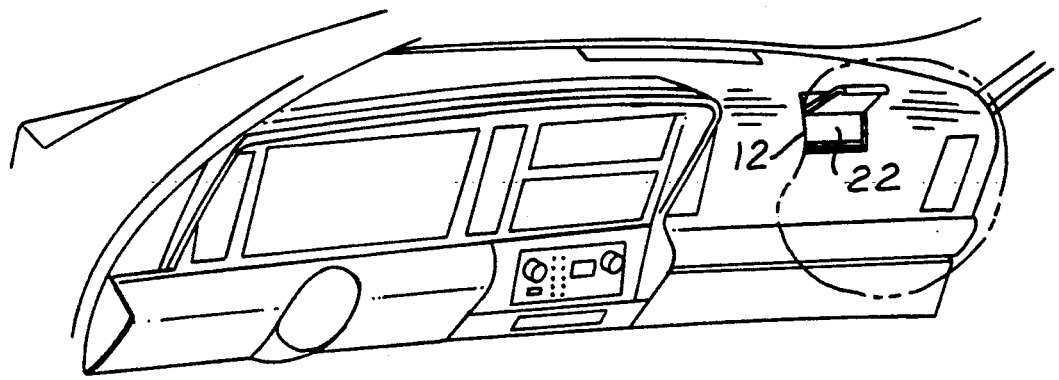
FIG. 2 is the instrument panel of FIG. 1 with the occupant restraint cushion closure door opened or deployed.

The closure door of the present invention is generally used in the instrument panel 10. The closure door 12 is shown in FIG. 1 in the ready or closed state. FIG. 2 shows the door open where the occupant restraint system such as an air bag is in the deployed state. The deployed air bag is not shown in the drawings. Such occupant restraint systems are described in U.S. Pat. Nos. 3,887,214 and 3,904,222 which are hereby incorporated by reference.

Figure 3:
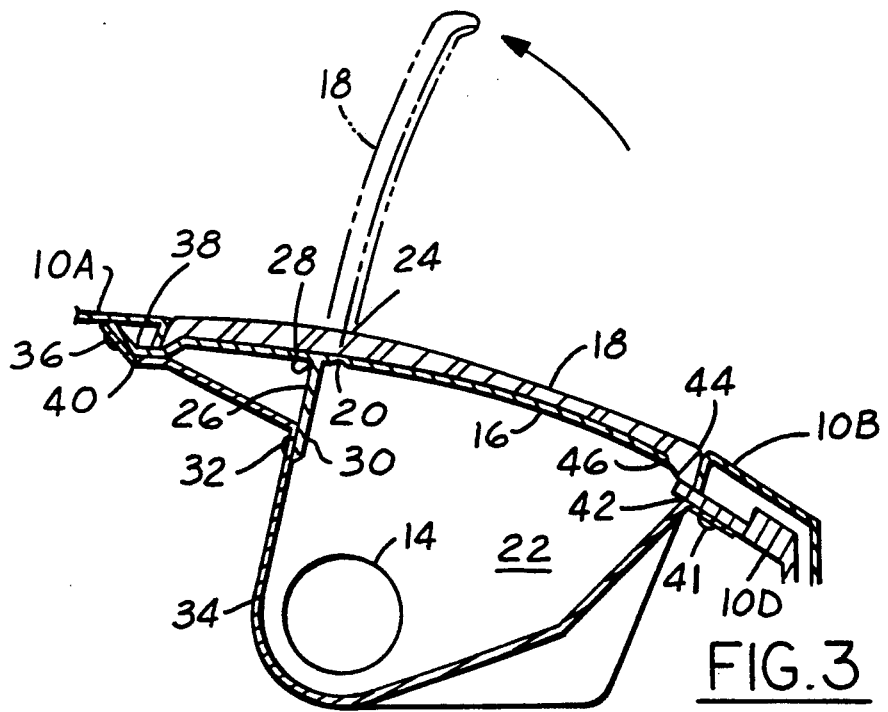
FIG. 3 is a side view of the closure door of the present invention.

The closure is preferably an integral portion of the instrument panel 10. Alternatively, the closure can be affixed to the recessed portion of instrument panel as is generally shown in FIG. 3.

The air bag or the occupant restraint system is generally shown at 14. The closure door is comprised of multiple layers, the first plastic layer 16 is generally comprised of a polypropylene and a thermoplastic elastomer. The second layer 18 is also comprised of a mixture of a polypropylene and a thermoplastic elastomer. The first layer has a durometer hardness greater than the second layer.

The closure goes from the closed state to the open state as shown in FIGS. 1 and 2 by virtue of the first hard plastic layer being deformed or breaking at point 20. Reference numeral 20 shows a frangible reduced thickness area of the first layer. When the occupant restraint cushion is deployed by the rapid expansion of the air bag, the force of the air bag coming out of the recessed area 22 breaks the first hard plastic layer at recessed portion 20. The recessed portion can be molded at a thickness generally about one-half of the thickness of the first layer. When the deployment of the occupant restraint system occurs and the first plastic layer breaks at point 20, likewise the second layer breaks as well in an area generally shown opposite to recessed area at point 24. Because the second layer 18 is softer, namely, a lower durometer hardness than the first layer, the bending and compressing of the second layer occurs relatively easily.

The first layer has a stem 26 which is molded in a T-shape where the upper portion 28 goes to the first layer and the bottom portion 30 is molded with a receiving area or a hole (not shown). The bottom portion can be secured to the recessed area by nut 32 which retains the recessed area 34 in place with the door closure. To securely hold the door closure to the recessed compartment, a second locking mechanism, namely, a bolt 36, secures the first layer appendage 38 to the cooperating appendage 40 of the recessed compartment. Other portions of the instrument panel are shown as 10A which is near that portion of the door closure which remains in place upon deployment of the occupant restraint cushion. Instrument panel portion 10B is near that portion of the door closure which opens upon expansion of the air bag. The remainder of the instrument panel 10D is secured to the recessed compartment 34 by securing means 41 which is a nut holding an appendage of the recessed compartment 42 to the instrument panel 10D.

FIG. 3 shows that the second soft layer is frictionally secured to the instrument panel 10B at reference numeral 44. It is to be appreciated that a frictional fit is all that is required to have the closure remain in place. The drawing likewise depicts that the appendage 44 is integrally molded such that it extends beyond the first layer at 46. It is to be appreciated that depending upon the design, the first layer may be directly attached to the instrument panel 10D in order to be more secure or give greater strength to the overall door structure. All that is required is that the soft layer at point 44 have sufficient friction which is overcome by the occupant restraint cushion being deployed so that the door closure goes from the closed position to the open position as shown in FIG. 3.

As has been described above, the closure is comprised of multiple plastic layers. The first plastic layer 16 is a molded layer prepared by injection molding of a mixture of a polypropylene and a thermoplastic elastomer. This layer performs the function of a substrate for the second softer layer 18. The substrate layer 16 is generally a layer of polypropylene and a thermoplastic elastomer. The durometer hardness of the substrate layer 16 is such that it is harder than the top layer 18. The durometer hardness would be on the Shore D scale preferably ranging from 30 to 100, even more preferably 50 to 90, especially about 80.

The soft layer 18 likewise is comprised of a mixture of a polypropylene and a thermoplastic elastomer. The durometer hardness of the soft layer 18 is generally a Shore A hardness, preferably 5 to 60, even more preferably 10–40, especially about 25.

The mixture of a polypropylene and a thermoplastic elastomer is generally prepared by blending the polymeric materials with any well known processing oil. The processing oil can be an aliphatic or aromatic hydrocarbon material. The processing oil can vary in compositional amounts from about 25 to 75 percent of the composition to be molded, preferably 25 to 60 and even more preferably about 40 to 60 percent by weight.

To assist the final composition in terms of thermal degradation, stability and overall processing, filler and thickeners may be added to the composition. By "filler" is meant a material which reinforces the composition. Some of the commercially available fillers which may be used are the calcium carbonate fillers such as Duramite, a trademark of the Thompson-Weinman Company; a talc, such as Emtal-41, a trademark of the Englehard Company; a clay, such as McNamee Clay, a trademark of the R.T. Vanderbilt Company; a calcium metasilicate, such as Wallastonite NYAD-400, a trademark of Interpace Company; a silicon dioxide, such as Imsil A-10, a trademark of Illinois Minerals, or Gold Bond R, a trademark of Illinois Minerals, or Gold Bond R, a trademark of Tammsco; a sodium-potassium aluminum silicate, such as Minex 7, a trademark of Kraft Chemical Company; a terephthalic acid, such as TA-33, a trademark of Amoco; a ground feldspar, such as LU-330, a trademark of Lawson United; a clay, such as AF-950, a trademark of the Englehard Company; a titanium dioxide, such as TR-900, a trademark of Du-Pont; an aluminum tri hydrate; a carbon black, such as Raven H-20, a trademark of Columbia Company; and a pyrogenic microsphere processed from fly ash, such as Orbaloid, a trademark of Midwest Filler Products, fiber, glass and the like. The filler may be a fly ash derivative, such as the pyrogenic microspheres provided by Midwest Filler Products Company.

The polypropylene material that may be used is preferably a commercially available material such as crystalline polypropylene or isotactic polypropylene, syndiotactic and tritactic polypropylene. The polypropylene may be a homopolymer or a copolymer such as ethylene propylene copolymer or ethylene propylene block copolymers. Polyolefin plastic blends such as polypropylene and polyethylene or polypropylene and minor amounts of an alphaolefin copolymer of 2–16 carbon atoms may be used as is described in U.S. Pat. No. 4,774,277, herein incorporated by reference.

The thermoplastic elastomers that may be used are generally a styreneated rubbery composition. Generally, the materials are styrene ethylene propylene polymers or styrene ethylene butylene-styrene block copolymers. Thermoplastic blends of copolymer rubber and polyolefin plastics are described in U.S. Pat. No. 3,835,201, hereby incorporated by reference. Blends of ethylene propylene diene monomer or ethylene propylene monomers are likewise useful. Thermoplastic elastomers containing ethylene propylene thermoplastic block copolymers are taught in U.S. Pat. No. 4,672,091 which is hereby incorporated by reference.

U.S. Pat. No. 4,871,805 likewise discloses styrene ethylene butylene styrene block copolymers and ethylene propylene copolymer rubber and is hereinafter incorporated by reference. Preferred styrene ethylene butylene styrene block copolymers are commercially available as Kraton G1650, G1651, G1652, G1657, G1701, G7528 (trademarks of Shell Chemical Company of Houston, TX) and the like.

The soft or second layer 18 is comprised of materials preferably as disclosed below.

| Ingredients | Range of Materials | Preferred Materials (wt %) |
|---|---|---|
| High Molecular Weight* S—EB—S Block Copolymer* | 25–55 | 30.5% |
| Polypropylene* | 1–20 | 7.5% |
| Aliphatic Hydrocarbon* Processing Oil | 25–70 | 56.5% |
| Stabilizers* | 0.1–5 | 1% |
| Calcium Carbonate* | 1–15 | 4.5% |
| Total | 100% | 100% |

*G7528

The hard substrate material 16 is comprised of the following ingredients:

| Ingredients | Range of Materials | Preferred Materials (wt %) |
|---|---|---|
| Polypropylene | 50–90 | 80% |
| Thermoplastic Elastomer | 10–50 | 20% |
| Total | 100% | 100% |

In some applications, in order to ensure high strength to the closure door, it has been found advantageous to incorporate a reinforcing means in the substrate 16. This could be accomplished by fibers such as glass fibers and the like, glass microballoons, or metallic screens such as aluminum, steel, and the like. Preferably, the screen would be a swiss cheese-type screen where along the line 20 a recessed notch is located, the screen would have a plurality of apertures so that the closure door would fracture along the frangible breaking means.

The thickness of substrate 16 ranges from 2.0 to 4.0 mm. The thickness for the soft top layer 18 ranges from 2.0 to 5.0 mm.

It has been found advantageous to coat or paint the outer portion of the soft member 18 in order for it to be color coordinated with the remainder of the instrument panel 10. A preferred coating composition is a polyol cross-linked with isocyanate to give a cross-linked polyurethane. The polyols that may be used are low molecular weight polyols or resinous polyols that have a molecular weight up to about 5000. Suitable polyols are di - and polyfunctional hydroxy compounds as hydroxyl terminated polyethers or polyesters and di - or polyisocyanates. Polyols such as trimethylol propane or hexane triol may be utilized. Uralkyds may also be used such as those based on castor oil and castor oil derivatives. The polyols may be diols, triols, tetrols or a combination of same to give the desired NCO/OH ratio.

Suitable polyols can also be poly(oxypropylene) glycols and derivatives of same based upon alkylene oxide derivation such as poly(oxypropylene), poly(oxyethylene) glycols, and the like.

The polyols are reacted with isocyanates of a wide variety. Suitable isocyanates are as follows:
isopherone diisocyanate,
propylene-1,2-diisocyanate,
butylene-1,3-diisocyanate,
butylene-1,2-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
dialkyl benzene diisocyanate, such as methylpropylbenzene diisocyanate, methylethylbenzene diisocyanate, and the like,
2-2'-biphenylene diisocyanate,
3,3'-biphenylene diisocyanate,
4,4'-biphenylene diisocyanate,
3,3'-dimelhyl-4,4'-biphenylene-diisocyanate, and the like,
methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like,
2,2'-oxidiphenyl diisocyanate,
3,3'-oxidiphenyl diisocyanate,
4,4'-oxidiphenyl diisocyanate, and the like,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like,
2,2'-sulfonediphenyl diisocyanate,
3,3'-sulfonediphenyl diisocyanate,
4,4'-sulfonediphenyl diisocyanate, and the like,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl) sulfide,
bis-(para-isocyano-cyclohexyl) sulfone,
bis-(para-isocyano-cyclohexyl) ether,
bis-(para-isocyano-cyclohexyl) diethyl silane,
bis-(para-isocyano-cyclohexyl) diphenyl silane,
bis-(para-isocyano-cyclohexyl) ethyl phosphine oxide,
bis-(para-isocyano-cyclohexyl) phenyl phosphine oxide,
bis-(para-isocyano-cyclohexyl) N-phenyl amine,
bis-(para-isocyano-cyclohexyl) N-methyl amine,
2,6-diisocyano-pyridine,
bis-(4-isocyano-phenyl) diethyl silane,
bis-(4-isocyano-phenyl) diphenyl silane,
dichloro-byphenylene diisocyanate, bis-(4-isocyano-phenyl) ethyl phosphine oxide,
bis-(4-isocyano-phenyl) phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-($\beta$-isocyano-t-butyl) toluene,
bis-(para-$\beta$-isocyano-t-butyl-phenyl) ether,
para-bis-(2-methyl-4-isocyano-phenyl) benzene,
3,3'-diisocyano adamantane,
3,3'-diisocyano biadamantane,
3,3"-diisocyanoethyl-1,1'-biadamantane,
1,2bis-(3-isocyano-propoxy) ethane,
1,2-dimethyl propylene diisocyanate,
3-methoxy-hexamethylene diisooyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxidiazole,
$OCH(CH_2)_3O(CH_2)_2O(CH_2)_3NCO$,
$OCH(CH_2)_3S(CH_2)_3NCO$,
$OCH(CH_2)_3N(CH_2)_3NCO$,
polymethylene polyphenyl isocyanate.

Biurets such as the biuret of hexamethylene diisocyanate and uretdiones may be used. The latter are obtained by the oligomerization of hexamethylene diisocyanate in the presence of suitable catalysts such as tributylphosphene and the like.

A number of blocking agents may also be used to produce a blocked isocyanate which could be used as the cross-linking agent. Such blocking agents will unblock at about 50° C. to make the isocyanate available. Such blocking agents are the phenol type, lactone type, active methylene type, alcohol type, mercaptan type, acid amide type, the imide, the amine type, the urea type, carbamate type, oxime type, sulfate type and the like. Most preferably a ketoxime type is preferred, and even more preferably a dialkyl ketoxime of from 1 to 4 carbon atoms per alkyl group. Most preferably, the ketoxime would be methylethyl ketoxime, methylisobutyl ketoxime, and the like.

Other inert materials may be added such as pigments for coloration, ultraviolet absorbers and antioxidants such as benzophenone derivatives and substituted benzotriazoles. Flow control agents may be added to enhance leveling and to avoid cratering and bubbling in the urethane coatings. Drying agents are also added to increase the viscosity of the urethane coating, to help eliminate bubbling and high solids content and to control sagging when the coatings are applied on vertical substrates. Suitable materials are cellulose acetate butyate or polyvinyl butyral. Because urethane coatings may exhibit a high gloss, flattening agents may be added to reduce the gloss. Suitable flattening agents are finely divided silicas, diatomaceous earth, certain metal stearates such as aluminum and zinc stearate, and the like.

While thermoplastic urethane coatings can be utilized, it is preferred that two component systems be used, namely, that the isocyanate be separate from the polyol until shortly before application. With a two component thermoset system, catalysts are generally used such as tin catalysts, amine catalysts and the like. On occasion, it has been found desirable to use amino formaldehyde as the curing agent such as an alkyl ether (methyl or butyl ether) of a methylol melamine or methylol urea derivative (melamine-urea formaldehyde condensation products or derivatives). Suitable urethane coating systems are disclosed in APPLIED POLYMER SCIENCE, by J. Kenneth Craver and Roy W. Tess, published by the American Chemical Society, 1975, pages 829-858, hereby incorporated by reference.

Having described the invention in general, listed below are embodiments wherein all parts are in parts by weight and all temperatures are in degrees Centigrade, unless otherwise indicated.

EXAMPLE

Step One — Preparing The Substrate

The substrate material is made by using a Unidyn Megacolor (trademark of Universal Dynamics Corp. of Woodbridge, VA) pelletized material mixer to blend a batch of 80 percent by weight glass reinforced polypropylene copolymer (SB224-2 (trademark of Himont Corporation of Troy, MI)) with 20 percent impact modifier (50% by weight of low density polyethylene and 50% by weight of Shell G1651). Table 1 shows the physical data of the mixed material.

A metal reinforcement is made by using a SAE-1008 steel sheet cut to a specific designed shape including off-set perforated holes along the flangible area.

Drying of the mixed material occurs using a Unidyn Model DHD-6 dryer at 180° F. for 4 hours. The mold is set in a HPM (Corporation of Mt. Gilead, OH) 500 ton injection molding machine with a 48 ounce injection unit.

The air bag door substrate is made by inserting the metal reinforcement into the cavity of the mold and injection molding over it and completely enclosing it within the plastic. Table 2 is the molding parameters.

Step Two — Molding Soft Cover

Table 3 shows the performance data of the soft cover material (Shell Kraton(R) G7528). It was dryed at 180° F. for two hours prior to molding. The mold was set in a HPM 500 ton injection molding machine with a 48 oz. injection unit. The part was finished by inserting the substrate from Step 1 into the cavity and injecting molding the Shell material G7528 overlay. Table 4 lists the molding parameters.

Step Three — Painting

The molded air bag door was washed in a soap and water solution and blown dry prior to decoration. The surface finish is accomplished by spraying a Dexter chlorinated hydrocarbon primer and a two-component polyurethane color paint over the molded air bag door soft cover. Parts were painted using Bink's air atomized spray equipment. Table 5 and Table 6 are the specifications of the primer and the coating respectively. The washing and painting were conducted at ambient temperature. The painted parts were then flashed at 80° F. for 15 minutes and baked at 175° F. in an oven.

TABLE 1

PHYSICAL PROPERTIES OF MIXTURE OF POLYPROPYLENE & SHELL KRATON G1651 AND POLYETHYLENE

| Physicals | |
| --- | --- |
| SPEC. GRAVITY | 1.00 |
| MELT FLOW (ASTM D1238 (0.1 g/min) | 3.20 |
| INTRINSIC MELT VISCOSITY (poise) 446 F. 245 lb., 25:1 L/D | 560 |
| TENSILE STRENGTH, psi (ASTM D638) (Type I, 2"/min) | |
| @ yield | 6070 |
| @ break | 6060 |
| ELONGATION, % (ASTM D638) | |
| @ yield | 6.00 |
| @ break | 6.40 |
| FLEXURAL MODULUS, psi (ASTM D790B) ¼" × ¼" × 5", 0.05"/min. | |
| Secant (0.1" deflect) | 242,600 |
| Tagent | 306,400 |
| FLEXURAL STRENGTH, psi (ASTM D790B) | 8,260 |
| HEAT DEFLECTOR TEMP (C.) 66/264 psi (ASTM D648) | 153/103 |
| HARDNESS (Shore D) | 83 |
| TOOL SHRINK (mils/in) | 4.3 |
| AFTERBAKE (mils/in) 1 hr. @ 250 F. | 5.1 |
| DYNATUP IMPACT, Room Temperature (23° C.) (5 mph, 3" Backup, 1" Dart) | |
| Ultimate Energy, (Jules) | 4.1 |
| Total Energy, (Jules) | 12.45 |
| Ultimate Force, (Neutron) | 1,280 |
| Sample Thickness, inches | 0.121 |

TABLE 2

SUBSTRATE PROCESSING PARAMETERS

| | Clamp Control | Position Units | Speed Sec. | Pressure psi. | Time (Sec.) |
| --- | --- | --- | --- | --- | --- |
| I (---- OPEN | | I | 13.25 | | |
| I | CLOSED --) | I | | | 1500 | 21.00 |
| I | SAFETY OFF --) | I | .02 | | 1500 | 10 |
| I --- ACCELERATE ---) | | I | 1.50 | 35 | 2000 | |
| I | HI SPEED ---) | I | | 40 | 2000 | |
| I | DECELERATE ---) | I | 6.00 | 11 | 450 | |
| I | (--- ACCELERATE -- | I | 2.00 | 15 | 2000 | |
| I | (--- HI SPEED | I | | 25 | 1500 | |
| I (--- DECELERATE | | I | 4.50 | 15 | 1500 | |

TABLE 2-continued
SUBSTRATE PROCESSING PARAMETERS

Temperature Control

HEAT: ON  ALARM LIMIT +/− : 20

| Zone | Set | Actual |
|---|---|---|
| # 1 | 480 | |
| # 2 | 430 | |
| # 3 | 430 | |
| # 4 | 420 | |

Microprocessor Injector Control

| | RAM POSN. | INJ. SPEED | SYSTEM PRESS (psi) |
|---|---|---|---|
| I (--BOTTOM --- SHOT LIMIT ----) | | | |
| I --- DECOMP.--) B    I - DECOMP.---)A | | | 2000 |
| I   (--CUSION ACT: 0.00 | | | |
| 10 9 8 7 6 5 4 3 2 1 0 | | | |
| | | .90 | 2100 |
| | | .80 | 2100 |
| | | .80 | 2100 |
| | | .60 | 2100 |
| | | .60 | 2100 |
| | | .50 | 2100 |
| | | .50 | 2100 |
| | | .50 | 2100 |
| | | .40 | 2100 |
| | | .40 | 2100 |
| EXTRUDER RPM. | | 35.00 | |

Pressure Control

| Hold Pressures | | Pack. Press | | Back Pressures | |
|---|---|---|---|---|---|
| Hold Time | : 25.0 | Plast. Delay | : | | : |
| Press. Steps | : 1 | Press. Steps | : | | : 1 |
| Step #1 | : 450 | Step #1 | : | | : 50 |
| | | PURGE PRESSURE | : 900 | | |

Process Control

| | SET POINT | ACTUAL |
|---|---|---|
| AUTOMATIC SHOT CORRECTION | : OFF | |
| Shot Size | : 5.25 unit | |
| AUTO FEED | : | |
| BOOST CUTOFF ON RAM POSITION | | |
| Cutoff Distance | : .50 unit | |
| Cushion | : | |

Auxiliary Equipment

MOLD AND DRYER TEMPERATURES

CAVITY : 125° F.          DRYER :
CORE : 125° F.
LIFTER :
PUMPS:
EXTRUDER PUMPS : 1
INJECTION PUMPS : 1
BOOSTER POSITION : OFF

EJECTOR RETRACT          EJECTOR FORWARD
POSITION   .50 Units     POSITION   1.75
SPEED      40            SPEED      40
PRESSURE   40            PRESSURE   40
EJECTOR / CORE   START POSITION   10.00 UNIT

TABLE 3
SHELL G7528 PHYSICAL PROPERTIES (1)

| Physicals | |
|---|---|
| SPEC. GRAVITY | 0.91 |
| SHORE A HARDNESS, inst/10 sec | 25/23 |
| TEST METHOD ASTM D2240 | |
| TENSILE PROPERTIES, par (2) | |
| TEST METHOD ASTM D412 | |
| Tensile strength, MPa (psi) | 5.8 (840) |
| 100% Modulus, MPa (psi) | 0.6 (84) |
| 300% Modulus, MPa (psi) | 1.8 (264) |
| 500% Modulus, MPa (psi) | 4.0 (581) |
| Ultimate Elongation, % | 640 |
| TENSILE PROPERTIES, perp (2) | |
| TEST METHOD ASTM D412 | |
| Tensile strength, MPa (psi) | >8.8 (1280)* |
| 100% Modulus, MPa (psi) | 0.4 (62) |
| 300% Modulus, MPa (psi) | 1.0 (140) |
| 500% Modulus, MPa (psi) | 2.1 (303) |
| Ultimate Elongation, % | >950* |
| TEAR STRENGTH, Die C | |
| TEST METHOD ASTM D624 | |
| parallel, kN/m (pli) | 10.1 (58) |

TABLE 3-continued

SHELL G7528 PHYSICAL PROPERTIES (1)

| Physicals | |
|---|---|
| perpendicular, kN/m (pli) | 22.0 (126) |
| WATER ABSORPTION, % wt (3) | <0.1 |
| TEST METHOD ASTM D570-6.1 | |

(1) Determined on laboratory-prepared injection molded 130 × 150 × 3.2 mm plaques.
(2) "par", parallel, machine direction, mold flow direction "perp", perpendicular or transverse to machine direction.
(3) Test specimens ¼" thick, 2.1" diameter discs
*Sample did not break within the travel of the (INSTRON) testing equipment

TABLE 4

PROCESSING PARAMETERS OF SHELL KRATON G7528

Clamp Control

| | Position Units | Speed Sec. | Pressure psi. | Time (Sec.) |
|---|---|---|---|---|
| I (---- OPEN | 18.00 | | | |
| I       CLOSED --) I | | | 1500 | 25.0 |
| I       SAFETY OFF --) I | .02 | | 2500 | 10.0 |
| I --- ACCELERATE ---) I | 1.50 | 25 | 600 | |
| I       HI SPEED ---) I | | 30 | 2100 | |
| I       DECELERATE ---) I | 6.50 | 12 | 400 | |
| I       (--- ACCELERATE -- I | 4.00 | 20 | 2100 | |
| I       (--- HI SPEED I | | 30 | 2100 | |
| I (--- DECELERATE I | 4.00 | 25 | 1500 | |

Temperature Control

HEAT: ON    ALARM LIMIT +/− : 20

| Zone | Set | Actual |
|---|---|---|
| # 1 | 450 | |
| # 2 | 440 | |
| # 3 | 430 | |
| # 4 | 400 | |

Microprocessor Injector Control

| | RAM POSN. | INJ. SPEED | SYSTEM PRESS (psi) |
|---|---|---|---|
| I (-- BOTTOM --- SHOT LIMIT ----) | I | | |
| I --- DECOMP. --) B | I - DECOMP. --)A | | 2100 |
| I    (-- CUSION ACT: 0.00 | I | | |
| I 10 9 8 7 6 5 4 3 2 1 0 | | | |
| | | 2.00 | 2100 |
| | | 2.00 | 2100 |
| | | 2.00 | 2100 |
| | | 2.00 | 2100 |
| | | 2.00 | 2100 |
| | | 1.50 | 2100 |
| | | 1.50 | 2100 |
| | | 1.00 | 2100 |
| | | .90 | 2100 |
| | | .50 | 2100 |
| EXTRUDER RPM. | 60.00 | | |

Pressure Control

| Hold Pressures | | Pack. Press | | Back Pressures | |
|---|---|---|---|---|---|
| Hold Time | : 10.00 | Plast. Delay | | | : |
| Press. Steps | : 1 | Press. Steps | | | : 1 |
| Step #1 | : 100 | Step #1 | | | : 50 |
| | | PURGE PRESSURE | | | : 900 |

Process Control

| | SET POINT | ACTUAL |
|---|---|---|
| AUTOMATIC SHOT CORRECTION | : OFF | |
| Shot Size | : 3.25 unit | |
| BOOST CUTOFF ON RAM POSITION | | |
| Cutoff Distance | : .50 unit | |
| Cushion | : | |

Auxiliary Equipment

MOLD AND DRYER TEMPERATURES

CAVITY : 125° F.    DRYER : Off
CORE : 125° F.
LIFTER :
PUMPS:

TABLE 4-continued

PROCESSING PARAMETERS OF SHELL KRATON G7528

EXTRUDER PUMPS : 1
INJECTION PUMPS : 1
BOOSTER POSITION :

| EJECTOR RETRACT | | EJECTOR FORWARD | |
|---|---|---|---|
| POSITION | 2.50 | POSITION | 3.00 |
| SPEED | 60 | SPEED | 50 |
| PRESSURE | 60 | PRESSURE | 50 |
| EJECTOR / CORE START POSITION | 12.00 | | |

COMMENTS:
  Fill Speed = 2.40 sec.

TABLE 5

DEXTER COATING SPECIFICATIONS

Product Data Sheet
Product Identification: Dextrasoft Very Dark Sapphire PD070106

Physical Constants

| Type | Polyested Polyol (m w$_m$ 100–6500) |
|---|---|
| Solids (By Weight) | Unmixed-56.3 ± 2% Mixed-54.87 ± 2.0% |
| Solids (By Volume) | Unmixed-46.9 ± 2% Mixed-45.2 ± 2.0% |
| V.O.C. Level | Mixed 4.0 lb/gal. |
| Coverage (Sq. Ft./Gal. Dry Mil) | 725 Mixed |
| Weight/Gallon | 8.9 ± 0.2 lb. |
| Viscosity at 77° F. | 17–20″ No. 3 Zahn (mixed) @ |
| Gloss | 60° F. Gardner 2–3 on a smooth surface |

Application
Mixing Instructions: Mix 4 volumes PD070106 with 1 volume PD070097. mix thoroughly

TABLE 6

DEXTER COATING SPECIFICATIONS

Product Data Sheet
Product Identification: Clear Dextrasoft Activator PD070097

Physical Constants

| Type | Isocyanate [Blend of TDI (toluene diisocyanate) and HDI (Saturated methylene diisocyanate) biuret] |
|---|---|
| Solids (By Weight) | 45.6 ± 2.0% |
| Solids (By Volume) | 38.2 ± 2.0% |
| Coverage | |
| Weight/Gallon | 8.43 ± 0.2 lbs. |
| Viscosity at 77° F. | Activator before mixing with Dextrasoft Bases Nos. 2 Zahn 16″–19″ |

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. An instrument panel capable of structural integrity in an interior of a vehicle and including a closure capable of opening by expansion of an occupant restraint cushion in the nature of a bag, the closure having two integral layers wherein a first layer has a frangible reduced thickness area on an opposite side of a second layer which area breaks upon expansion of the restraint cushion and opening of the closure;
   wherein the second layer has a Shore A hardness and is softer than the first layer and has a sufficiently bendable area near the frangible reduced thickness area of the first layer that said bendable area will not break in the interior of the vehicle when said frangible area breaks upon opening of the closure, whereby the second layer remains intact and integral with the first layer after the expansion of the restraint cushion and opening of the closure.

2. The panel of claim 1 wherein the first layer has a durometer hardness ranging from 30 to 100 on the Shore D scale and the second layer has a durometer hardness ranging from 5 to 60 on the Shore A scale.

3. The panel of claim 1 wherein the first and second layers include a styrene ethylene propylene elastomer.

4. The panel of claim 1 wherein the first and second layers include a styrene ethylene butylene styrene elastomer.

5. The panel of claim 1 wherein the first and second layers include a copolymer of polypropylene and polyethylene.

6. The panel of claim 1 wherein the softer layer is comprised of a styreen ethylene butylene styrene block copolymer.

7. The panel of claim 1 wherein the first layer has a durometer of 50 to 90 Shore D.

8. The panel of claim 1 wherein the second layer has a durometer of 10 to 40 Shore A.

9. The instrument panel of claim 1 wherein the second layer includes an appendage which extends beyond he first layer and is frictionally fit in the instrument panel prior to expansion of the restraint cushion and opening of the closure.

10. The instrument panel of claim 1 wherein both layers are comprised of a thermoplastic elastomer composition.

* * * * *

UNITED STATES PATENT AND TRADEMARK OFFICE
CERTIFICATE OF CORRECTION

PATENT NO. : 5,158,322

DATED : October 27, 1992

INVENTOR(S) : Xingyuan Sun

It is certified that error appears in the above-identified patent and that said Letters Patent is hereby corrected as shown below:

Col. 14, Claim 6, Line 45, delete the misspelled word "styreen" and insert therein the word --- styrene---.

Col. 14, Claim 9, Line 53, delete the incorrect word "he" before the words "first layer", and insert therein the word --- the ---.

Signed and Sealed this

Nineteenth Day of October, 1993

Attest:

BRUCE LEHMAN

*Attesting Officer*     *Commissioner of Patents and Trademarks*